United States Patent
Raffaelli

(10) Patent No.: US 12,296,918 B2
(45) Date of Patent: May 13, 2025

(54) TILTING SADDLE-RIDING MOTOR VEHICLE WITH TWO TILTING FRONT STEERED WHEELS AND TWO NON-TILTING REAR DRIVING WHEELS

(71) Applicant: PIAGGIO & C. S.p.A., Pontedera (IT)

(72) Inventor: Andrea Raffaelli, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 0 days.

(21) Appl. No.: 18/560,461

(22) PCT Filed: May 9, 2022

(86) PCT No.: PCT/IB2022/054263
§ 371 (c)(1),
(2) Date: Nov. 13, 2023

(87) PCT Pub. No.: WO2022/238855
PCT Pub. Date: Nov. 17, 2022

(65) Prior Publication Data
US 2024/0246630 A1    Jul. 25, 2024

(30) Foreign Application Priority Data

May 12, 2021    (IT) .......................... 102021000012131

(51) Int. Cl.
*B62K 5/10*    (2013.01)
*B62K 5/01*    (2013.01)
*B62K 5/08*    (2006.01)

(52) U.S. Cl.
CPC .................. *B62K 5/10* (2013.01); *B62K 5/01* (2013.01); *B62K 5/08* (2013.01)

(58) Field of Classification Search
CPC .................................. B60K 5/18; B60K 5/10
See application file for complete search history.

(56) References Cited

U.S. PATENT DOCUMENTS

2009/0194961 A1 *   8/2009   Dieziger .................. B62K 5/01
                                                       280/124.103

FOREIGN PATENT DOCUMENTS

| AU | 2009261753 A1 | * | 2/2011 | ................ B60F 3/00 |
| CN | 106143734 A | * | 11/2016 | ............ B62K 25/04 |
| CN | 211223709 U | | 8/2020 | |
| CN | 111959658 A | | 11/2020 | |
| DE | 102012107154 A1 | | 2/2014 | |
| EP | 1070658 A1 | | 1/2001 | |
| EP | 3455123 B1 | | 9/2020 | |
| FR | 2872772 A1 | * | 1/2006 | .......... B60G 21/007 |
| JP | S60183280 A | | 9/1985 | |
| JP | 2010076545 A | | 4/2010 | |
| JP | 6648155 B2 | * | 2/2020 | ............... B62D 9/02 |

(Continued)

*Primary Examiner* — Nicole T Verley
(74) *Attorney, Agent, or Firm* — McGlew and Tuttle, P.C.

(57) ABSTRACT

The tilting saddle-riding motor vehicle (1) includes a frame (3), two front steered wheels (11A, 11B) and two rear driving wheels (15A, 15B). The front steered wheels and the frame are adapted to perform a tilting movement during travel, while the rear driving wheels are supported on a carriage (19) which does not have a tilting movement and is connected to the frame by means of a tilting joint, which allows the frame to rotate around the roll axis, for example on a bend, while the carriage (19) does not participate in the tilting movement, i.e. it does not tilt to the right or left.

21 Claims, 19 Drawing Sheets

(56) References Cited

FOREIGN PATENT DOCUMENTS

| WO | WO-2012007819 A1 * | 1/2012 | ............... B60G 3/01 |
| WO | WO-2017115295 A1 * | 7/2017 | ........... B60G 21/007 |
| WO | WO-2017194686 A1 * | 11/2017 | ........... B60G 21/007 |
| WO | WO-2017194688 A1 * | 11/2017 | |
| WO | WO-2021094940 A1 * | 5/2021 | .............. B62J 25/04 |
| WO | WO-2022157765 A1 * | 7/2022 | ............... B60G 3/20 |

* cited by examiner

TILTING SADDLE-RIDING MOTOR VEHICLE WITH TWO TILTING FRONT STEERED WHEELS AND TWO NON-TILTING REAR DRIVING WHEELS

TECHNICAL FIELD

The present invention relates to the field of tilting saddle-riding motor vehicles. Specifically, embodiments described herein relate to a four-wheel tilting saddle-riding vehicle, i.e., capable of performing tilting movements while in motion, such as when moving along a curved trajectory.

BACKGROUND ART

Typically, saddle-riding vehicles have a rear driving wheel and a front steered wheel, connected by a frame that supports the engine. The two-wheel saddle-riding vehicle is, by nature, a rolling, i.e., tilting, vehicle, i.e., a vehicle that tilts when cornering by performing a swinging movement around a median axis that is located on the ground.

Tilting, i.e., rolling, saddle-riding vehicles having more than two wheels are also becoming increasingly common. Some of these vehicles have two front steered wheels and one rear driving wheel. The front steered wheels are connected to a frame by a linkage system that allows the vehicle to tilt. These front steered wheels lie in planes parallel to each other, which are orthogonal to the ground when the vehicle is traveling in a straight trajectory, and which tilt relative to the ground with a tilting movement when the vehicle is traveling in a curved trajectory. In this case, the vehicle frame performs a similar tilting movement.

Other tilting saddle-riding vehicles comprise a front steered wheel and two rear driving wheels mounted in such a way as to perform tilting movements. These driving wheels lie on planes parallel to each other, which are orthogonal to the ground when the vehicle is traveling in a straight trajectory, and which tilt relative to the ground in a tilting movement when the vehicle is traveling in a curved trajectory. In this case, the vehicle frame performs a similar tilting movement.

There are also tilting saddle-riding vehicles that comprise a front steered wheel and two non-tilting rear driving wheels, i.e., which do not tilt sideways during travel. The frame is connected to the rear driving wheels by a joint that allows the frame, on which the saddle is mounted, to perform a tilting movement while the planes on which the rear wheels lie remain orthogonal to the ground on which the vehicle travels.

EP3455123 discloses a tilting motor vehicle having three or four wheels. This prior art motor vehicle comprises a rear driving wheel supported by a fork pivoted to a frame. The fork is provided, relative to the frame, with a springing movement through a rear suspension interposed between the fork and the frame. A motor, which transmits motion to the driving wheel by means of a chain, is rigidly connected to the frame. The frame is composed of two parts connected by a tilting joint. The rear part of the frame that rigidly supports the engine and the suspension fork of the rear driving wheel is connected to the front part of the frame by means of the tilting joint, so that the front part of the frame can perform tilting movements relative to the rear part of the frame. The front part of the frame supports a steering column that transmits a steering movement imparted by a handlebar to a pair of front steered wheels. The front steered wheels are connected to the front part of the frame by means of a four-bar linkage to allow the tilting movement of the motor vehicle. The motor vehicle disclosed in EP3455123 comprises as unsprung mass only the rear driving wheel (or pair of rear driving wheels), while the engine is part of the suspended mass integral with the frame.

Additional tilting motor vehicles are disclosed in JPS60183280 and EP1070658.

Each of these motor vehicles has advantages and disadvantages.

The object of the present invention is to provide a four-wheel tilting saddle-riding motor vehicle that provides safety and ride comfort and that partly or entirely overcomes one or more of the limitations of known motor vehicles.

SUMMARY OF THE INVENTION

Substantially, according to the invention a four-wheel tilting saddle-riding motor vehicle is provided, comprising a frame and a steering column, accommodated rotatably in a steering tube integral with the frame, and integral with a handlebar. The motor vehicle further comprises a pair of front steered wheels, connected to the frame by the interposition of at least one tilting four-bar linkage. Each of the two front steered wheels is adapted to perform a rolling movement, i.e., a tilting movement around an axis parallel to the ground on which the motor vehicle rests and travels and passing through the point of contact of the wheel. The tilting four-bar linkage comprises a plurality of components pivoted to one another around pivot axes parallel to each other. Deformation of the tilting four-bar linkage allows the frame, the left front steered wheel and the right front steered wheel to perform a tilting movement, taking a tilted position during travel, for example, when the motor vehicle takes a curve. The motor vehicle further comprises a pair of rear driving wheels supported by a non-tilting rear carriage, on which a propulsion unit of the motor vehicle is arranged, hereafter also referred to as a powertrain or power unit, or simply motor. Since the carriage is not tilting, during travel the rear driving wheels remain with their own plane orthogonal to the ground on which the motor vehicle travels. The plane on which the wheel lies is basically the median plane of the wheel, orthogonal to the rotation axis of the wheel. To allow the frame of the motor vehicle to perform the tilting movement, with the rear driving wheels maintaining the plane on which they lie orthogonal to the ground, a tilting joint is provided, which connects the non-tilting rear carriage to the frame. The tilting joint defines a roll axis around which the frame rotates relative to the rear carriage when the motor vehicle tilts, i.e., performs a tilting movement, for example while traveling along a curve.

The motor vehicle may advantageously include a rear suspension, adapted to allow a springing movement of the frame relative to the rear carriage, and a suspension hinge defining a suspension axis extending in a direction transverse to the direction of travel of the vehicle, the frame and the rear carriage being adapted to perform springing movements around the suspension axis.

In embodiments disclosed herein, the propulsion unit is rigidly constrained to the rear carriage so as not to participate in the springing movement. In practice, by arranging the rear suspension so as to allow the springing movement of the frame relative to the rear carriage, the propulsion unit and the rear driving wheels form an unsprung mass of the motor vehicle, i.e., a mass that does not perform the springing movement allowed by the suspension of the motor vehicle.

In some embodiments, the roll axis may consist of a rotation axis of a hinge formed by the tilting joint.

In other embodiments, the tilting joint comprises a connecting four-bar linkage, which connects the frame to the rear carriage. The connecting four-bar linkage may include: a lower transverse connecting rod integral with the frame; an upper transverse connecting rod integral with the rear carriage; a left rocker arm; and a right rocker arm, which connects the upper connecting rod to the lower connecting rod.

In some embodiments, the upper transverse connecting rod is longer than the lower transverse connecting rod, such that the left rocker arm and the right rocker arm are inclined relative to a median plane of the motor vehicle and converge toward each other from the upper transverse connecting rod to the lower transverse connecting rod. The roll axis may in this case be represented by a straight line passing through the point of intersection of the extensions of the two rocker arms.

In suitable embodiments, the roll axis and the pivot axes of the at least one tilting four-bar linkage form between them an angle comprised between 0° and 30°, preferably between 0° and 15°.

In some embodiments, the roll axis defined by the tilting joint that connects the frame to the rear carriage may be inclined relative to the supporting surface of the motor vehicle by an angle such that the roll axis intersects the supporting surface at a point of intersection located between the left rear driving wheel and the right rear driving wheel and is oriented from bottom to top in the direction of travel of the motor vehicle. For example, the point of intersection may advantageously be located between the contact area of the left rear driving wheel with the supporting surface, and the contact area of the right rear driving wheel with the supporting surface.

The suspension hinge may be arranged between the rear carriage and the tilting joint. In this case, the rear suspension may be hinged at a first end to an arm integral with the rear carriage and pivoted to the tilting joint around the suspension axis, and at a second end to a point rigidly connected to the tilting joint, and more precisely in a position of the tilting joint such that the roll axis is located between the frame and the second end of the rear suspension. In this way, the carriage is provided with an oscillatory springing movement around the suspension axis, which causes a compression and a relaxation of the rear suspension, while the tilting joint does not participate in this springing movement.

In other embodiments, the suspension hinge may be arranged between the tilting joint and the frame. In this case, the rear suspension may be hinged at a first end to the tilting joint and at a second end to the frame. In this case, the spring joint participates in the springing movement, i.e., in the oscillation around the suspension axis, which causes the compression and relaxation of the spring suspension.

The front suspensions, associated with the tilting four-bar linkage(s), and the rear suspension, associated with the rear carriage, may generally comprise an elastic member and a viscous member, preferably coaxial to each other.

Further advantageous features and embodiments of the motor vehicle of the present invention are defined in the appended claims and disclosed in greater detail below with reference to the accompanying drawings.

BRIEF DESCRIPTION OF THE DRAWINGS

The invention will be better understood by following the description and accompanying drawings, which illustrate non-limiting examples of embodiments of the motor vehicle according to the invention. In the accompanying figures, various non-essential parts of the motor vehicle are omitted. In particular, the fairings are omitted, and in some cases also other parts such as the saddle, wheels, handlebars, etc. More in particular, in the drawing.

DETAILED DESCRIPTION

Figure 1:
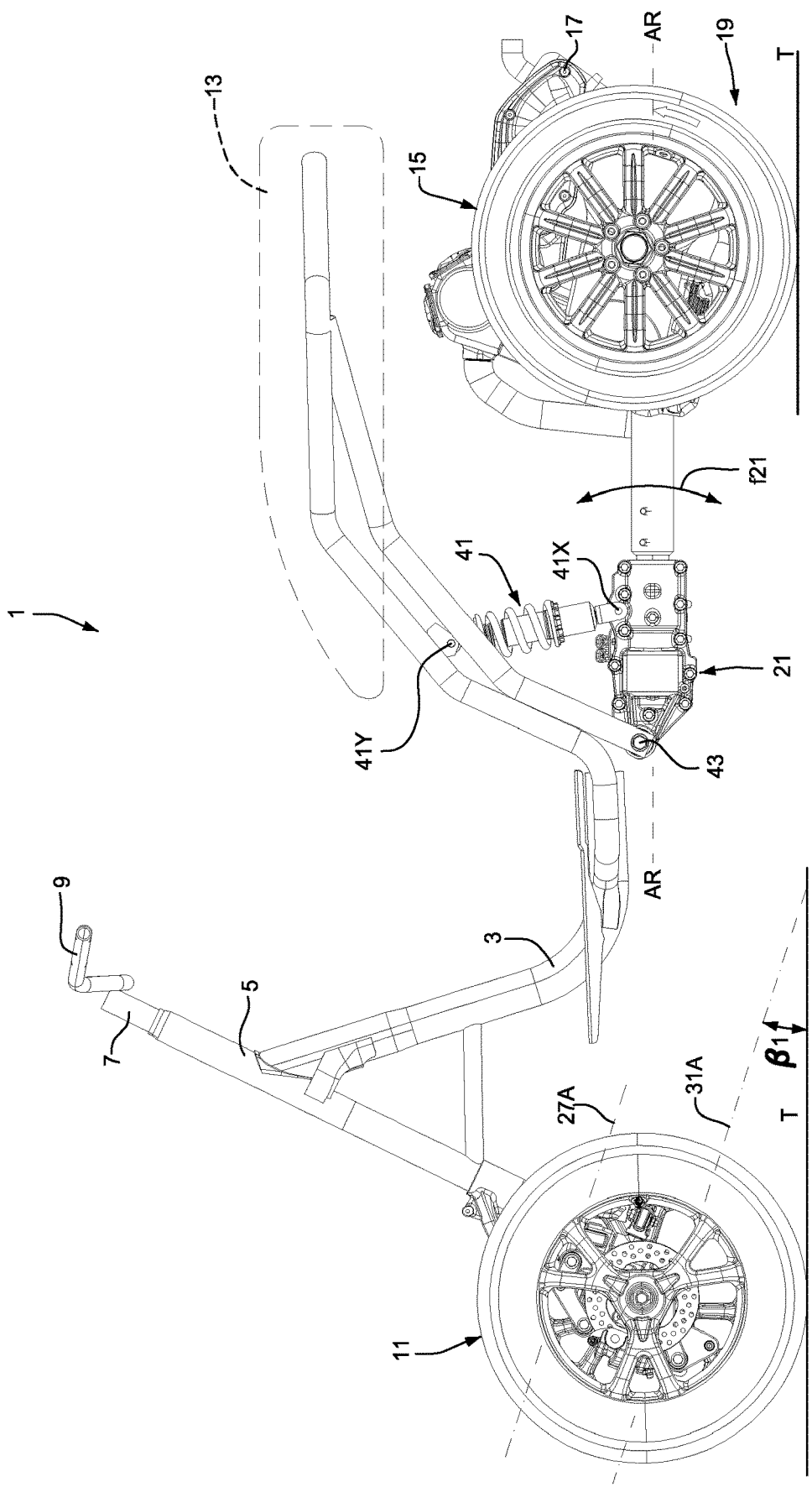
FIG. 1 shows a side view of an embodiment of the motor vehicle of the present invention, in a zero-tilting angle position.

A first embodiment of a motor vehicle according to the invention is illustrated in FIGS. 1 to 8.

In this embodiment, the motor vehicle 1 comprises a frame 3, with which a steering tube 5, in which a steering column 7, integral with a handlebar 9, is accommodated rotatably, is integral, or is a part of. By means of the handlebar 9, the steering movement of a pair of front steered wheels 11 is controlled, of which, more particularly, 11A indicates the left front steered wheel and 11B indicates the right front steered wheel.

A fairing is attached to the frame, which has been removed for clarity of the drawing. The reference number 13 schematically indicates a saddle, omitted in some figures, for the driver (not shown).

The motor vehicle 1 further comprises a pair of driving wheels 15. More particularly, 15A indicates a left rear driving wheel and 15B indicates a right rear driving wheel. The rear driving wheels 15A, 15B are substantially coaxial and are driven in rotation by a powertrain 17. The powertrain may be an internal combustion reciprocating engine, or an electric motor. In some embodiments, the powertrain 17 may be a hybrid powertrain, comprising an endothermic engine and an electric motor in combination.

The rear driving wheels 15A, 15B, and the powertrain 17 are mounted on a rear carriage indicated as a whole with 19. The rear carriage 19 is connected to the frame 3 by means of a tilting joint 21, which allows the frame 3 to perform a tilting movement around a roll axis AR lying in a vertical median plane of the motor vehicle 1 when the motor vehicle is upright at a zero tilting angle. In this way, the frame 3 may tilt to the right or left with a tilting movement in which the driver sitting on the saddle 13 participates, for example when the motor vehicle 1 travels round a curve.

In the embodiment described herein, the tilting joint 21 essentially defines a hinge, the axis of which coincides with the roll axis AR. In other embodiments, described below, the tilting joint may have a more complex form, and comprise, for example, a four-bar linkage, such that the roll axis does not coincide with the axes of the hinges defining the four-bar linkage.

In FIGS. 1 to 4, the motor vehicle 1 is shown in a vertical position at rest, with a zero tilting angle, the tilting angle being defined between a plane orthogonal to the ground and the median plane of the frame 3 of the motor vehicle. In substance, in FIGS. 1 to 4 the motor vehicle 1 is in the upright position taken when the motor vehicle 1 is stationary, or is traveling in a straight line. In FIGS. 5 to 8, the same vehicle is shown tilted to the right, i.e., with a non-zero tilting angle and inclined to the right. This position is taken, for example, when the vehicle is traveling around a curve and the greater the speed of travel and the smaller the radius of curvature of the curved trajectory followed by the motor vehicle 1 is, the greater the tilt is.

Figure 6:
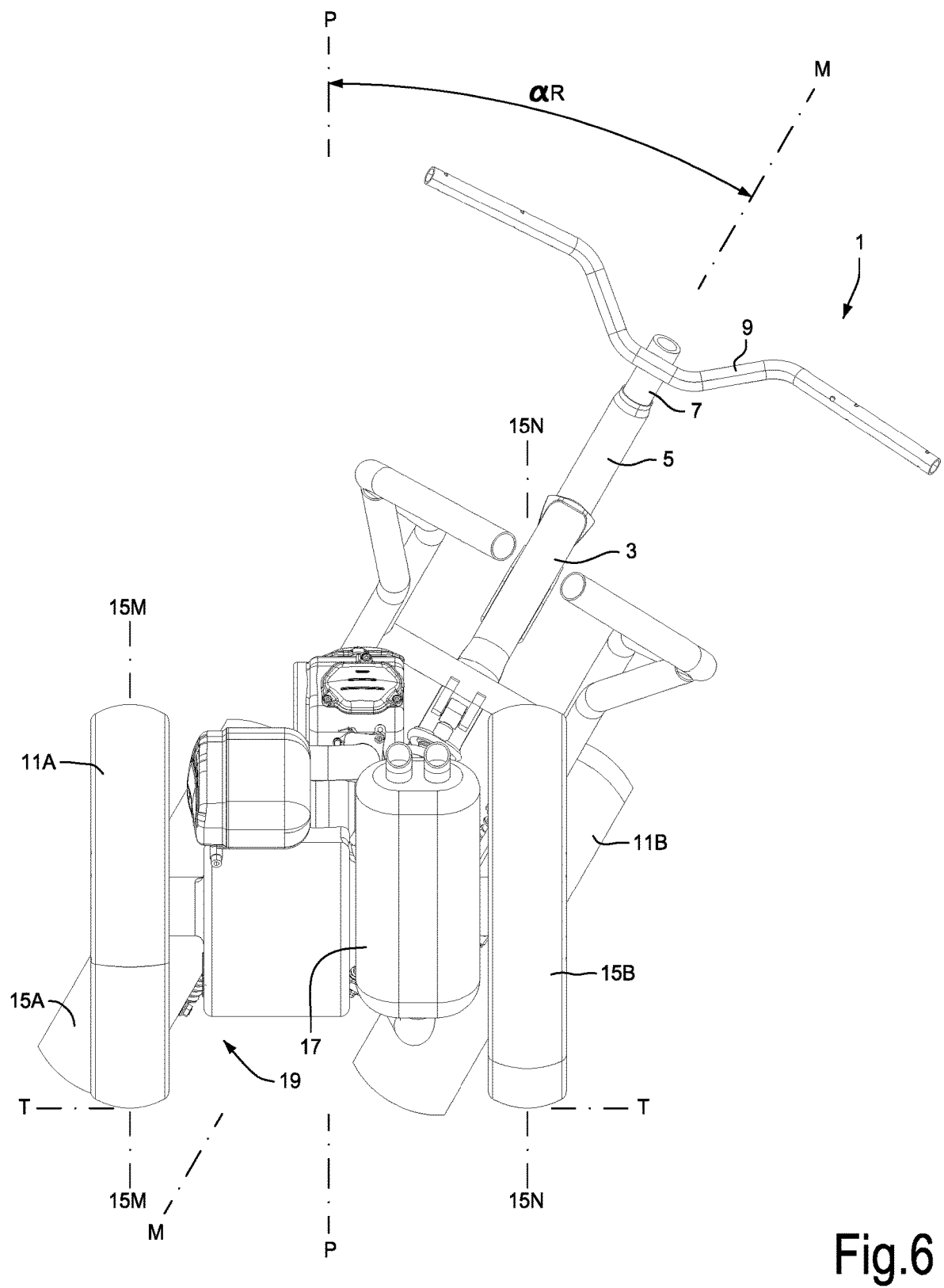
FIG. 6 shows a rear view of the tilted motorcycle.
Figure 7:
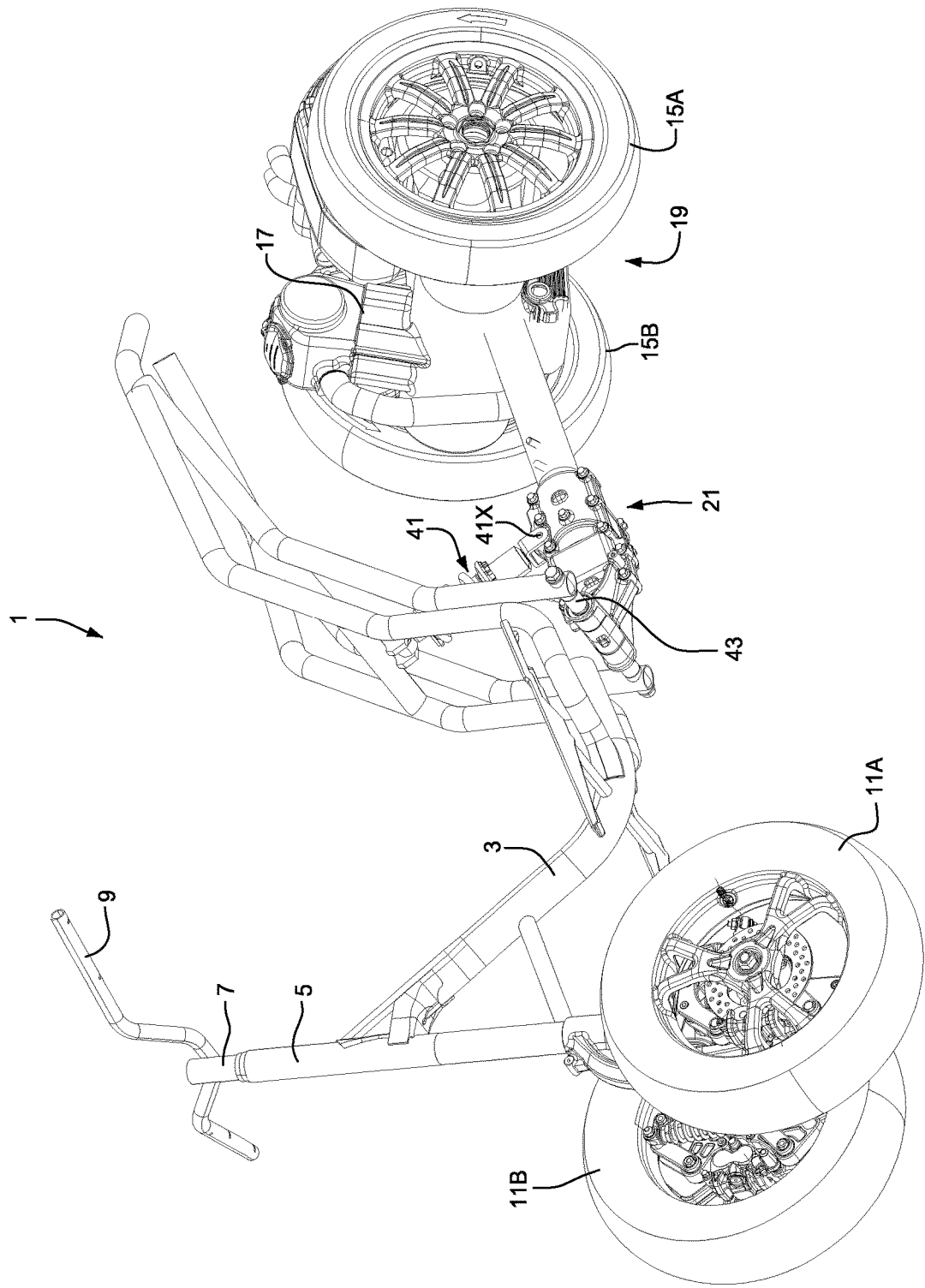
FIGS. 7 and 8 show axonometric views according to two different angles of the tilted vehicle.
Figure 8:
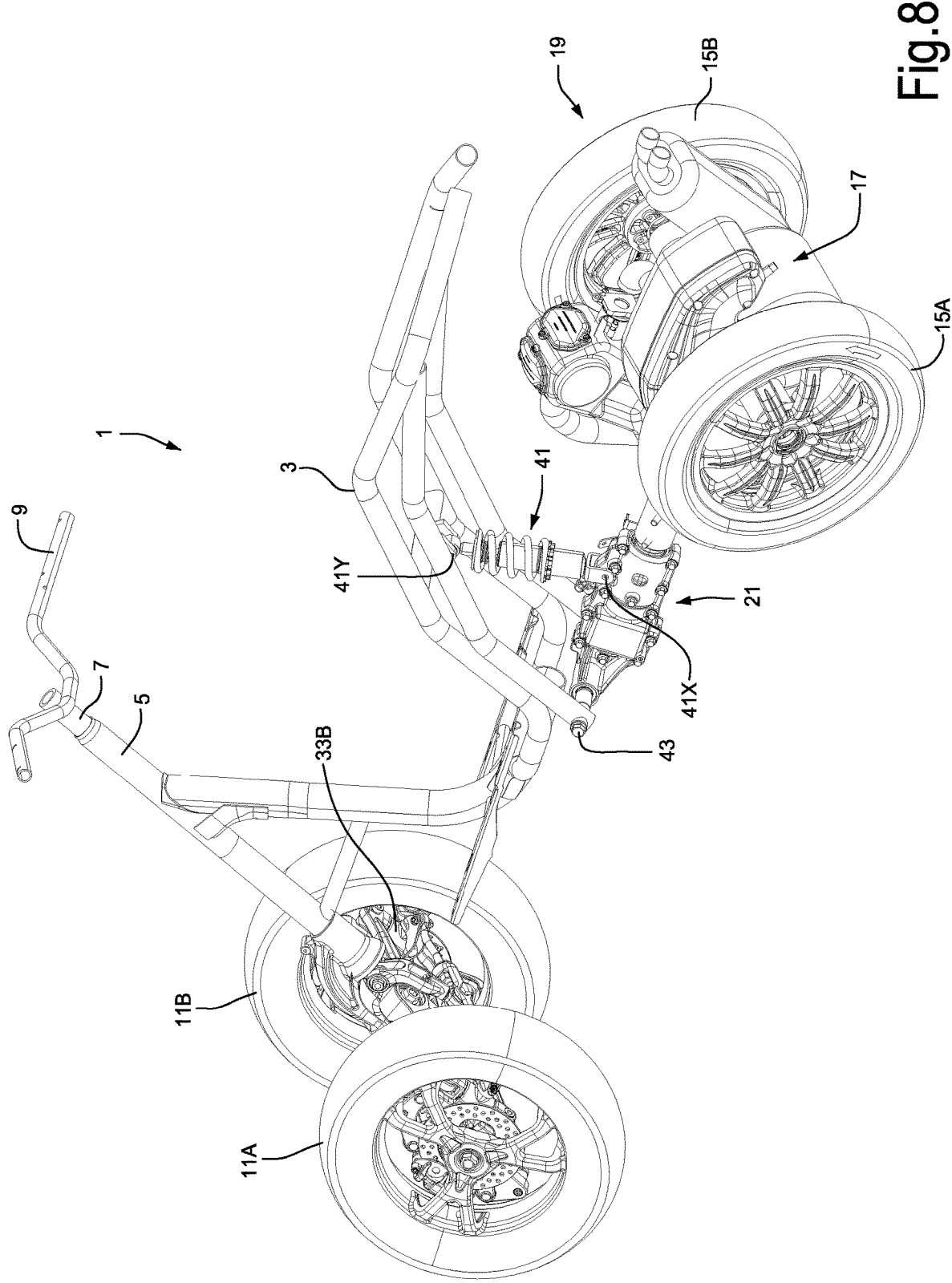

In FIG. 6, T-T indicates the plane representing the ground on which the motor vehicle 1 rests and travels, P-P indicates a plane orthogonal to the ground and M-M indicates the median plane of the motor vehicle. In the position in FIG. 6, the motor vehicle 1 is tilted by a tilting angle $\alpha R$. When the motor vehicle 1 is stationary or moving in a straight line, the tilting angle $\alpha R$ is zero (zero tilting angle).

In the embodiment illustrated in FIGS. 1 to 8, the roll axis AR has a zero inclination relative to the ground T-T on which the motor vehicle 1 is resting. However, this condition is not essential, as will be apparent from the description of other embodiments.

As can be seen in FIGS. 4 to 8, the rear carriage 19 does not participate in the tilting movement of the motor vehicle 1. The two rear driving wheels 15A, 15B remain with their center planes (indicated by 15M in FIG. 6) orthogonal to the ground T-T. In this sense, the rear carriage 19, the rear driving wheels 15A, 15B and the powertrain 17 do not participate in the tilting movement of the motor vehicle. This makes it possible to use a particularly simple transmission between the powertrain 17 and the rear driving wheels 15A, 15B. In addition, the powertrain 17 is rigidly connected to the rear carriage 19 and the rotation axes of the rear driving wheels 15A, 15B are fixed relative to the rear carriage 19.

Conversely, the front steered wheels 11A, 11B participate in the tilting movement of the frame 3, as shown in particular in FIG. 6. In practice, the front steered wheels 11A, 11B tilt by the tilting angle following the tilt of the frame 3 and remaining parallel to each other. For this purpose, the front steered wheels are connected to the frame by the interposition of a linkage system that allows the tilting movement.

Figure 2:
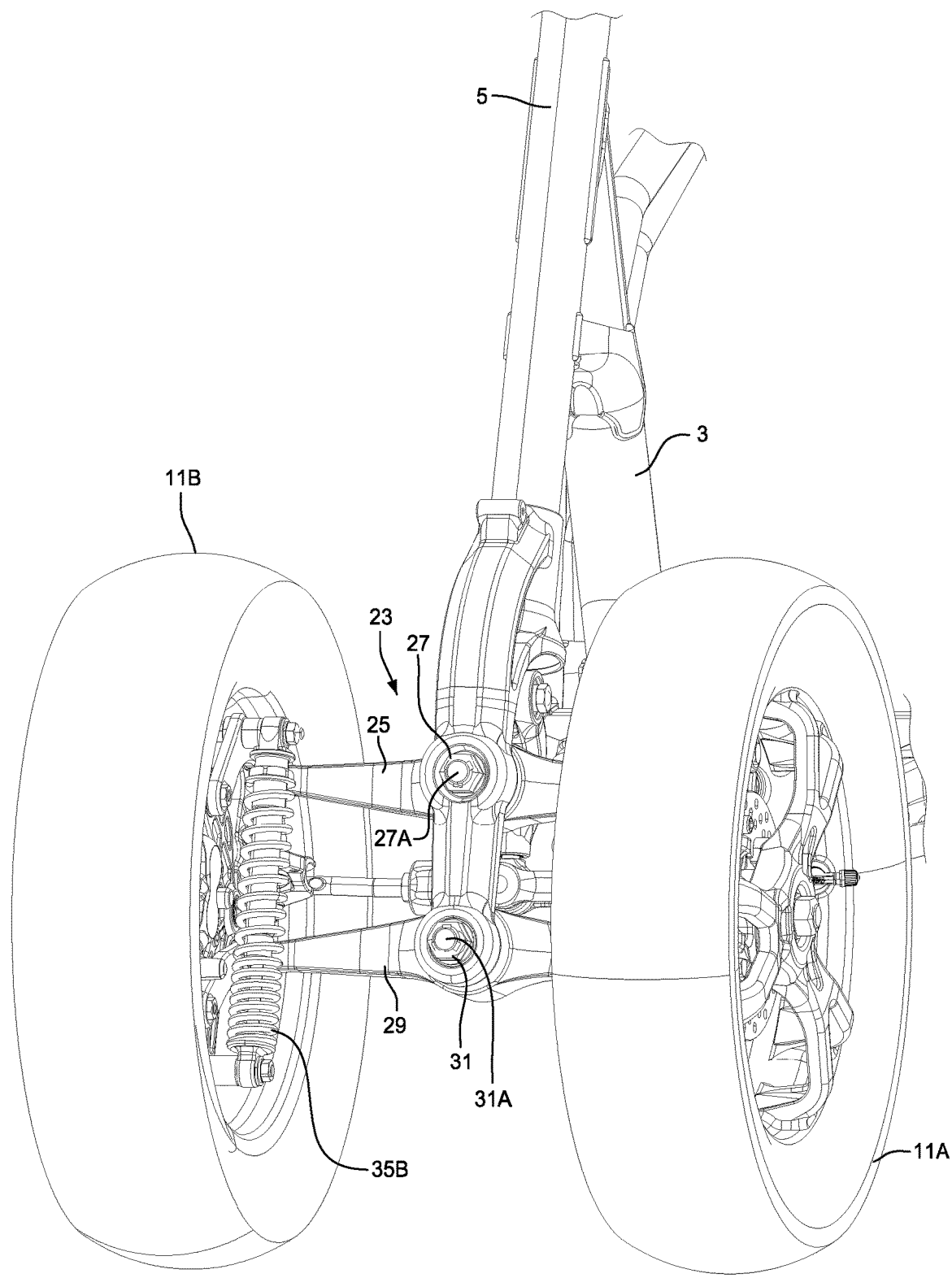
FIG. 2 shows an axonometric view of the forecarriage of the motor vehicle of FIG. 1.
Figure 3:
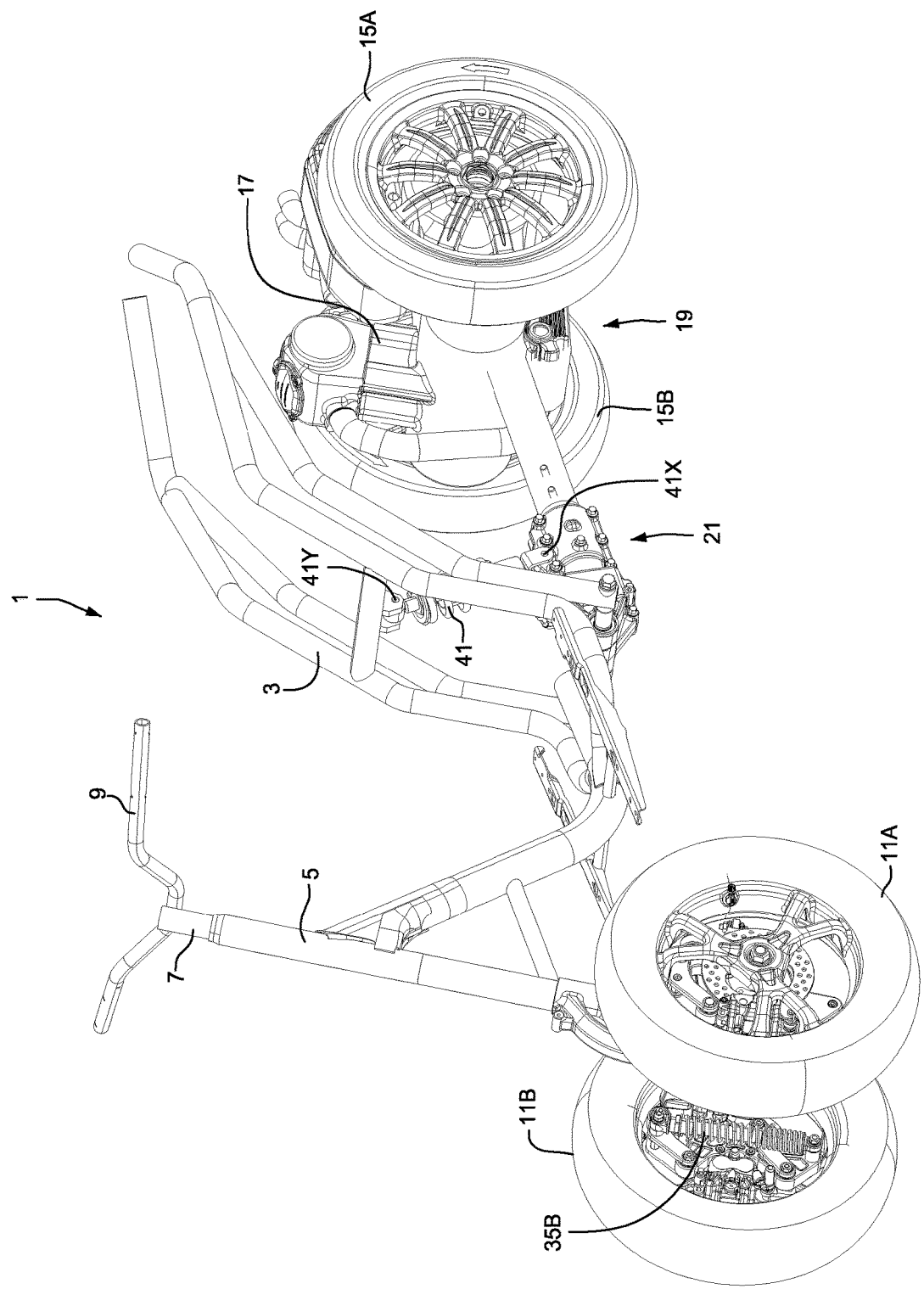
FIGS. 3 and 4 show overall axonometric views of the motor vehicle of FIG. 1, according to two different angles.
Figure 4:
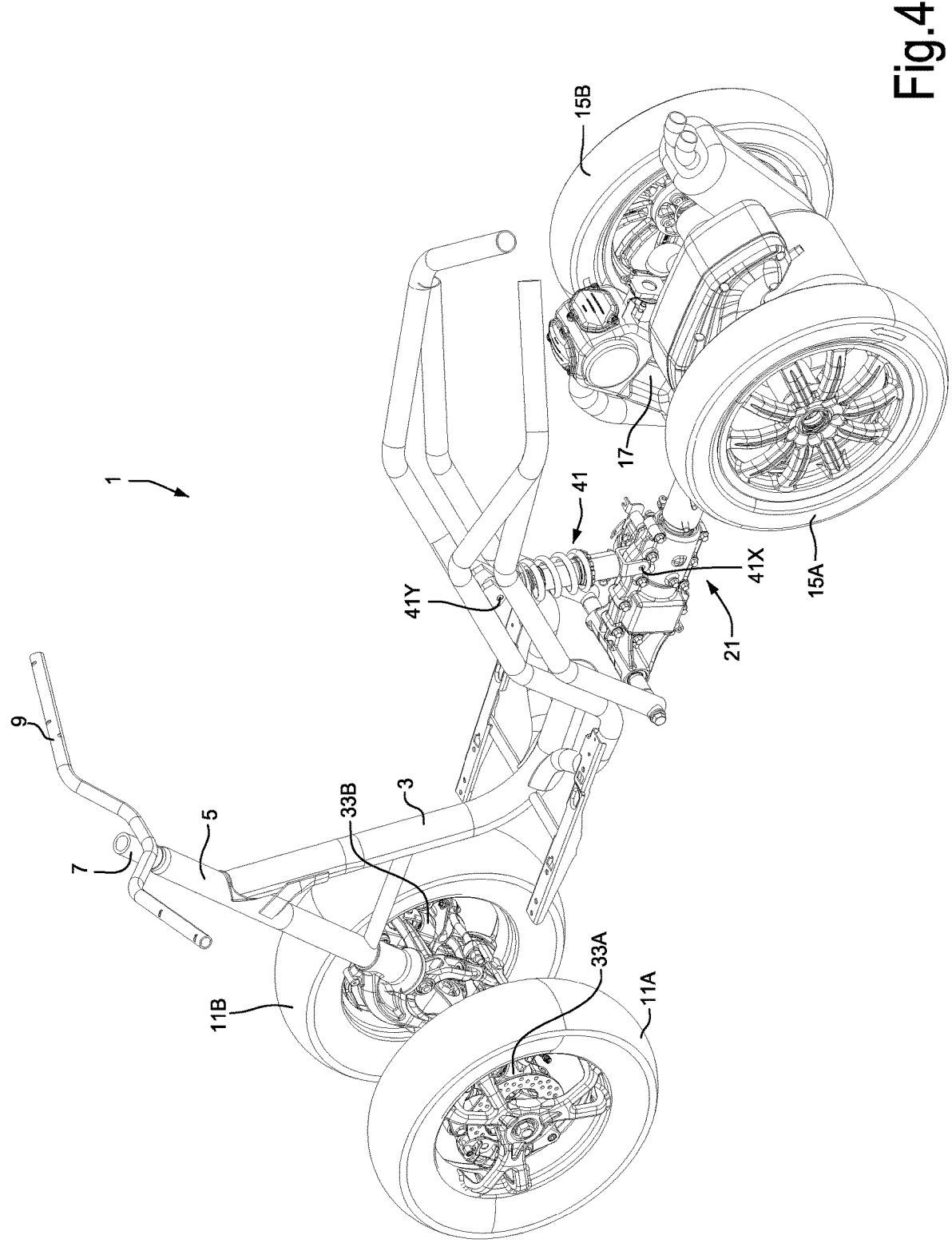
Figure 5:
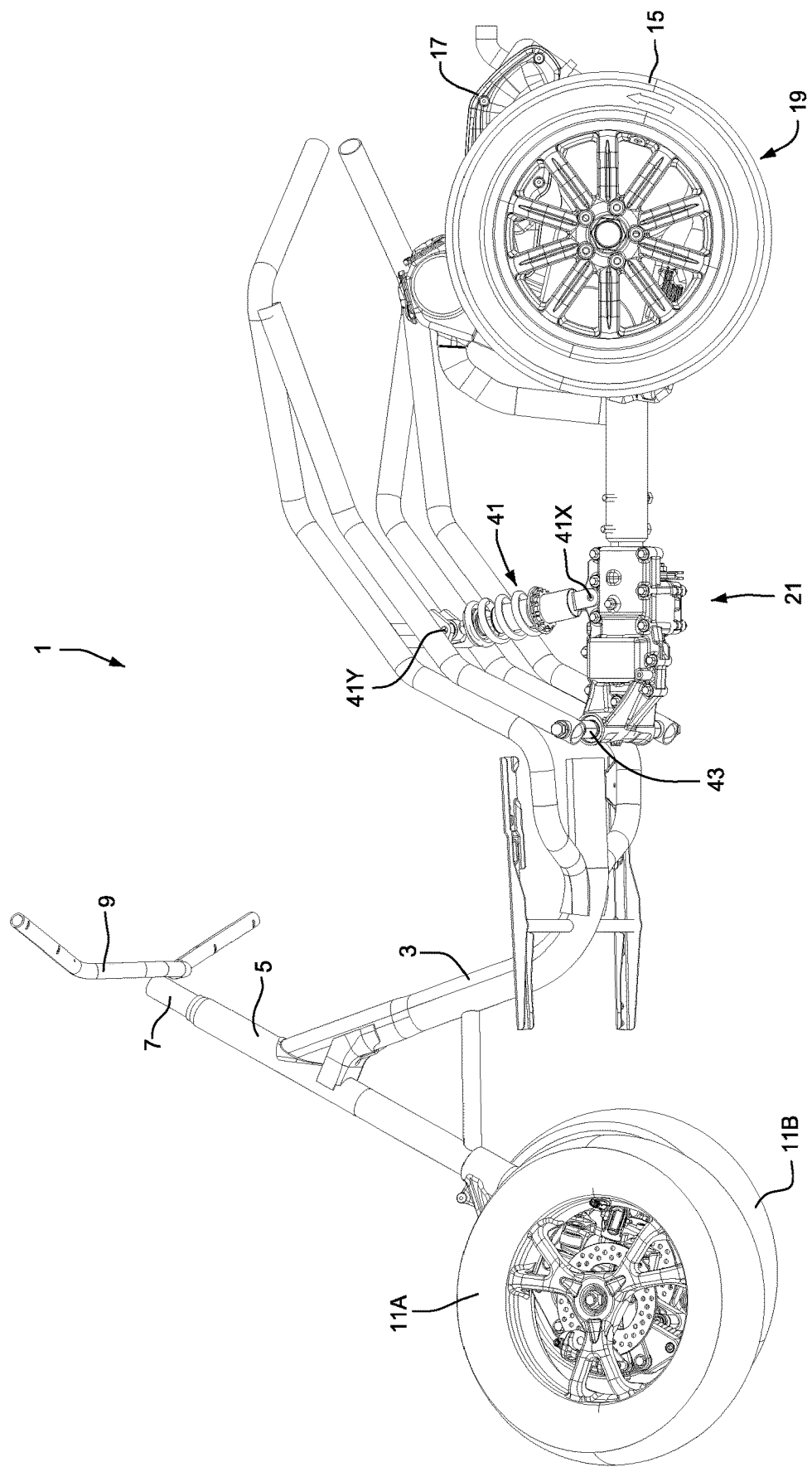
FIG. 5 shows a side view similar to the view of FIG. 1 of the same motor vehicle in a tilted position, i.e. with a tilting angle different from zero.

In the embodiment illustrated in FIGS. 1 to 8, a tilting four-bar linkage is provided for this purpose, indicated as a whole with 23 and shown in particular in FIG. 2.

In the illustrated embodiment, the tilting four-bar linkage 23 is located at approximately the same height of the front steered wheels 11A, 11B. In practice, the tilting four-bar linkage 23 is positioned between the two front steered wheels 11A, 11B and more particularly in this embodiment the overall height, i.e., the dimension in vertical direction, of the tilting four-bar linkage 23 is substantially less than the diameter of the front steered wheels, so as to remain contained within a cylindrical envelope surface tangent to the two front steered wheels 11A, 11B. As will be described below, in other embodiments the tilting four-bar linkage 21 may be positioned differently, for example completely above the space occupied by the front steered wheels 11A, 11B.

The tilting four-bar linkage 23 may comprise an upper cross member 25, pivoted to the frame 3 by means of an upper central hinge or pivot 27, which defines an upper central pivot axis 27A (see in particular FIG. 1). In the illustrated embodiment, as can be seen in FIG. 1, when the motor vehicle 1 is in an upright position with zero tilting angle, the upper central pivot axis 27A is located in a vertical plane, in particular in the median plane M-M of the motor vehicle, and is inclined by an angle $\beta 1$ relative to the supporting surface T-T of the motor vehicle 1.

The tilting four-bar linkage 23 further comprises a lower cross member 29, pivoted to the frame 3 by means of lower central hinge or pivot 31, which defines a lower central pivot axis 31A (see in particular FIG. 1). In the illustrated embodiment, as can be seen in FIG. 1, when the motor vehicle 1 is in an upright position with a zero tilting angle, the lower central pivot axis 31A is located in a vertical plane, in particular in the median plane M-M of the motor vehicle, and is inclined by an angle $\beta 1$ relative to the supporting surface T-T of the motor vehicle 1. In substance, therefore, the axes 27A and 31A are parallel to each other.

The left ends of the upper cross member 25 and of the lower cross member 29 are joined together by a left upright or rocker arm 33A, to which the left front steered wheel 11 is constrained by the interposition of a left front suspension 35A. The right ends of the upper cross member 25 and of the lower cross member 29 are joined together by a right upright or rocker arm 33B, to which the right front steered wheel 11B is constrained through the interposition of a right front suspension 35B. In general, the right and left front suspensions 35A, 35B comprise an elastic member and a viscous member, i.e., a shock absorber. The uprights or rocker arms 33A, 33B are pivoted to the cross members 25, 29 by means of hinges that define axes parallel to each other and parallel to the axes 27A, 27B. When the motor vehicle 1 is upright, the axes of said hinges lie on a plane orthogonal to the ground T-T and form with the plane T-T an angle $\beta 1$.

The structure of the front part of the motor vehicle illustrated in FIG. 1 is only an example. Those skilled in the art know that tilting saddle-riding vehicles with a tilting four-bar linkage in the low position between the two front steered wheels 11A, 11B may have different shapes from the one illustrated, which may be used alternatively.

Characteristically, the difference between the angle $\beta 1$ (formed between the pivot axes of the tilting four-bar linkage 23 and the supporting surface T-T of the motor vehicle 1) and the angle formed by the roll axis AR of the tilting joint 21 with the supporting surface T-T differ by no more than 30°, preferably by no more than 15°. In the example illustrated in FIGS. 1 to 8, the roll axis AR is parallel to the supporting surface T-T of the motor vehicle 1, i.e., to the ground, and therefore the angle $\beta 1$ is preferably equal to or less than 30°, more preferably equal to or less than 15°, for example between 0° and 5°, or between 0° and 10°.

The front steered wheels 11A, 11B are constrained to the tilting four-bar linkage 213 so as to be able to perform rotation movements around the respective steering axes. The rotation movement around the steering axes is transmitted by the handlebar 9 by means of the steering column 7 and a steering bar 37 (see FIG. 2).

The springing of the frame 3 relative to the rear driving wheels 15A, 15B is provided by a rear suspension 41, comprising an elastic element and a viscous element (shock absorber). The rear suspension 41 is pivoted at a first end in 41X to the tilting joint 21 and at a second end in 41Y to the frame 3, so as to allow a springing movement of the tilting joint 21 relative to the frame 3, indicated by the double arrow f21 in FIG. 1. To allow this movement, the tilting joint 21 is pivoted to the frame 3 by means of a suspension hinge 43 that defines a transverse axis, which in position with the vehicle upright at a zero tilting angle is parallel to the ground T-T and extends in a left-right direction, orthogonal to the median plane M-M of the motor vehicle 1.

Figure 9:
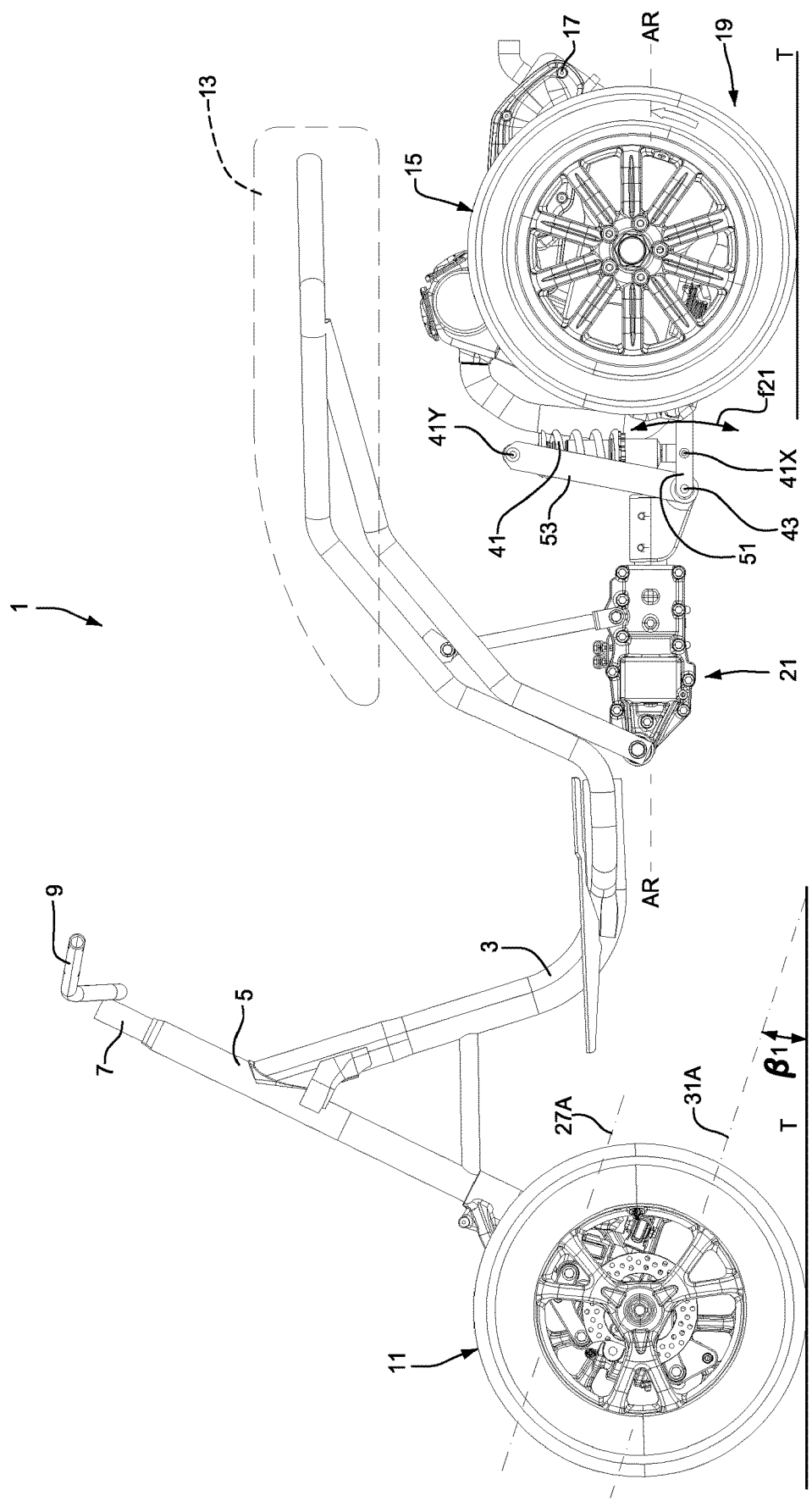
FIG. 9 shows a side view of a motor vehicle in another embodiment.
Figure 10:
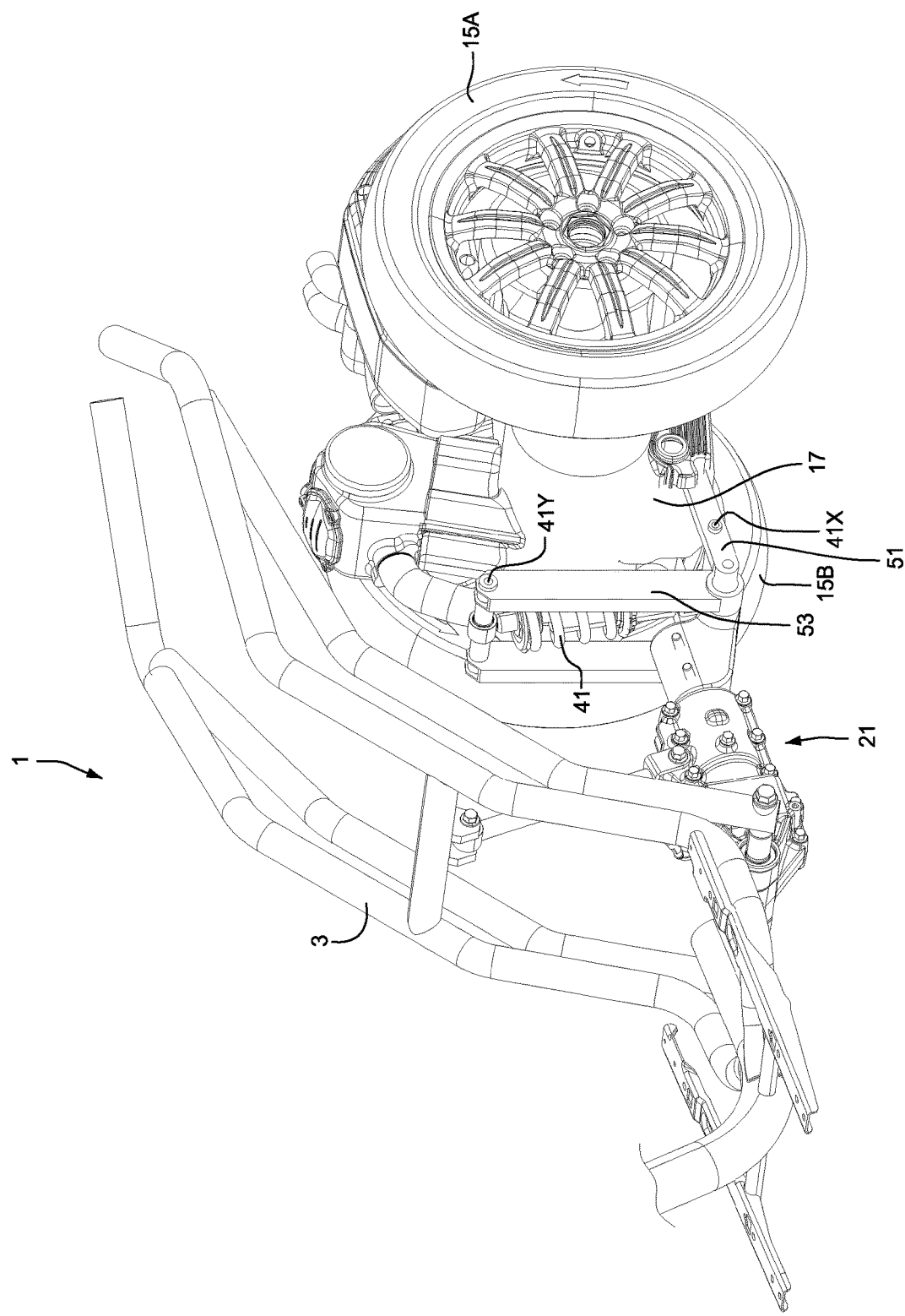
FIG. 10 shows an axonometric view of the rear part of the vehicle of FIG. 9.

FIGS. 9 and 10 show the rear part of a motor vehicle 1 in a further embodiment. Parts that are the same as or correspond to those described with reference to FIGS. 1 to 8 are indicated with the same reference numerals. The embodiment of FIGS. 9 to 10 differs from the embodiment of FIGS. 1 to 8 in particular as regards the arrangement of the rear suspension 41. In FIGS. 9 and 10, the rear suspension 41 is located between the rear carriage 19 and the tilting joint 21 and is pivoted in 41X, 41Y to arms 51, 53. The arm 53 is integral with one of the two portions that form the tilting hinge defined by the tilting joint 2. The arm 51 is hinged by means of a suspension hinge 43 to the tilting joint 21. The suspension hinge 43 defines a transverse axis orthogonal to the median plane M-M of the motor vehicle 1, when the motor vehicle is in an upright position, i.e., at a zero tilting angle. The rear springing movement is indicated again by the double arrow f21.

The front part of the motor vehicle of FIG. 1 can be configured as illustrated in FIGS. 1 to 8, or as illustrated in the figures described below.

Also in this case, the roll axis AR is parallel to the supporting surface T-T (ground) of the motor vehicle 1, but as will be seen with reference to other embodiments described below, this condition is not mandatory.

Figure 11:
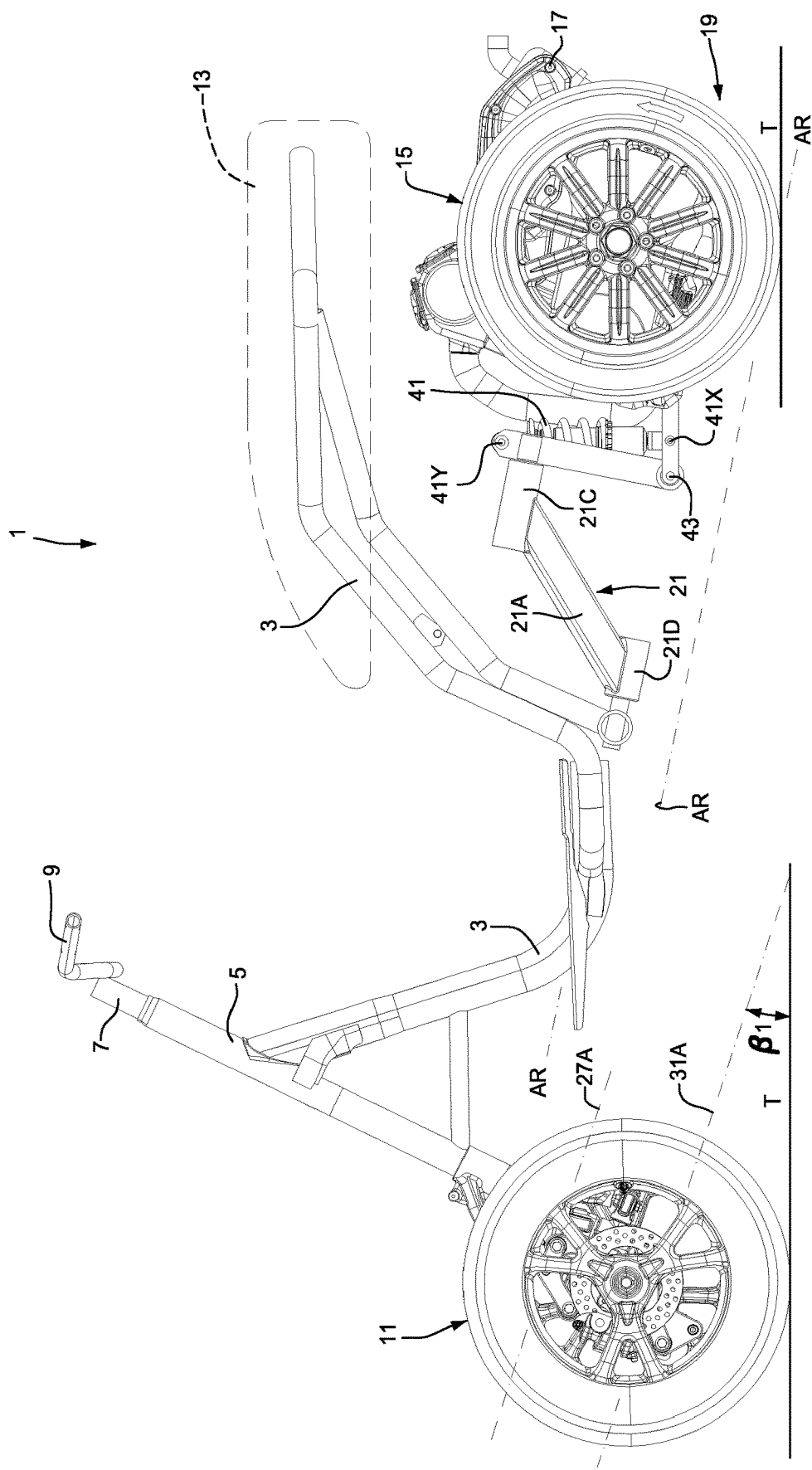
FIG. 11 shows a side view of a motor vehicle in a further embodiment.
Figure 12:
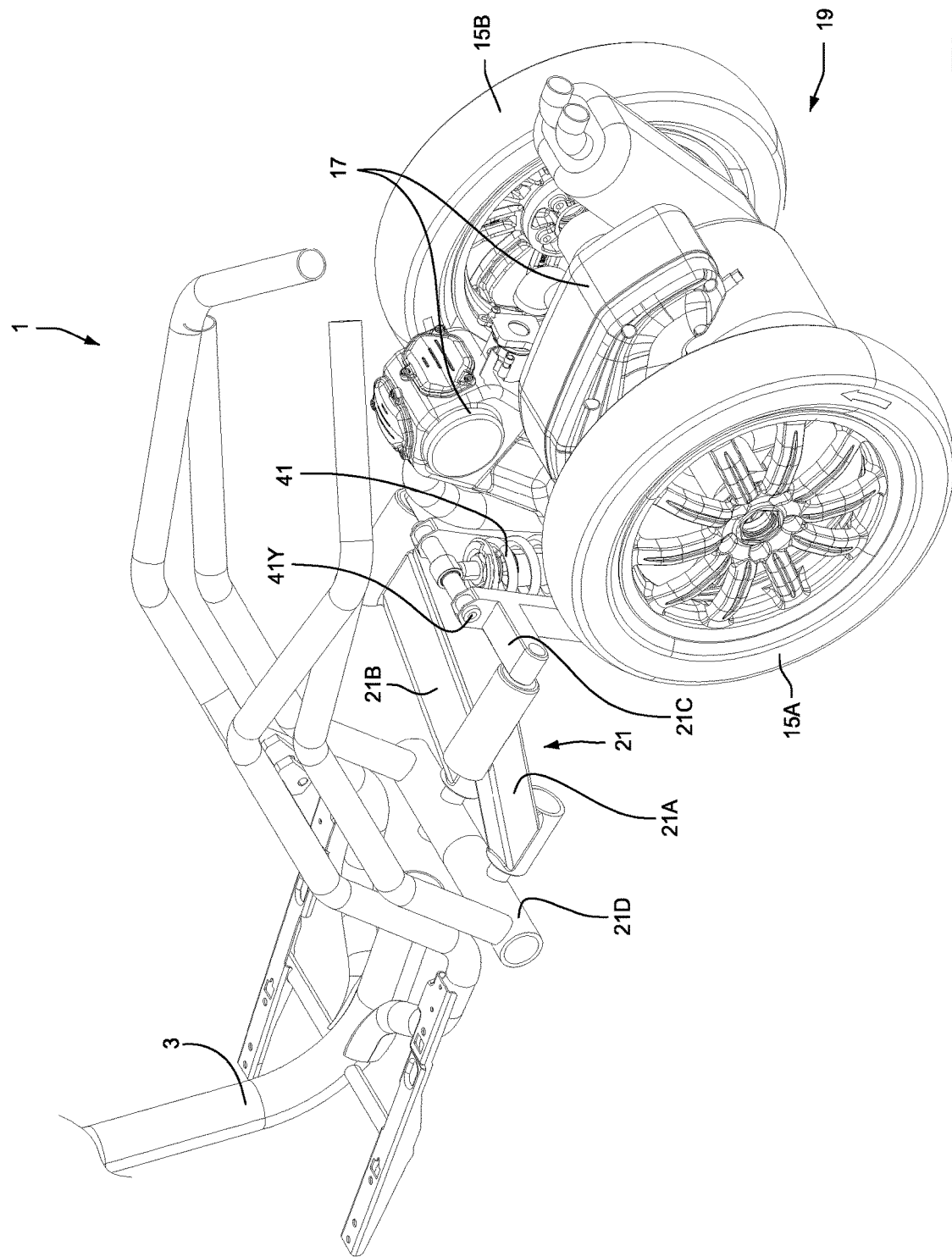
FIG. 12 shows an axonometric view of the central and rear part of the motor vehicle of FIG. 11.

FIGS. 11 and 12 show a simplified side view and a partial axonometric view of the rear portion of a motor vehicle 1 in a further embodiment. The same numbers indicate parts the same as or corresponding to those described with reference to the example embodiments. The front part of the motor vehicle 1 of this embodiment may be equal to that described with reference to FIGS. 1 to 8 or to those described below.

While in the embodiments described so far, the tilting joint 21 defines, in substance, a hinge with a roll axis AR, in the embodiment of FIGS. 11 and 12, the tilting joint 21 is formed by a four-bar linkage connecting the frame 3 to the rear carriage 19. The connecting four-bar linkage is again labeled 21, since it essentially forms a tilting joint, with a function similar to the tilting joints 21 described above with reference to FIGS. 1 to 10. The connecting four-bar linkage comprises a lower transverse connecting rod 21D integral with the frame 3 and an upper transverse connecting rod 21C integral with the rear carriage 19. The two connecting rods 21D and 21C are connected to each other by a left rocker arm 21A and a right rocker arm 21B. Typically, the upper transverse connecting rod 21C is longer than the lower transverse connecting rod 21D. In this way, the left rocker arm 21A and the right rocker arm 21B are symmetrical relative to the median plane M-M of the motor vehicle 1, are inclined relative to said median plane M-M, and converge toward each other from the upper transverse connecting rod toward the lower transverse connecting rod.

The roll axis AR is a straight line parallel to the pivot axes of the connecting four-bar linkage 21 (i.e., to the axes of the hinges connecting the connecting rods 21C, 21B to the rocker arms 21A, 21B) and passing through the point of intersection of the extension of the rocker arms 21A, 21B.

The position of the roll axis AR changes as the tilting angle changes. FIG. 11 shows the roll axis AR when the motor vehicle 1 is in a vertical position (zero tilting angle).

Figure 13:
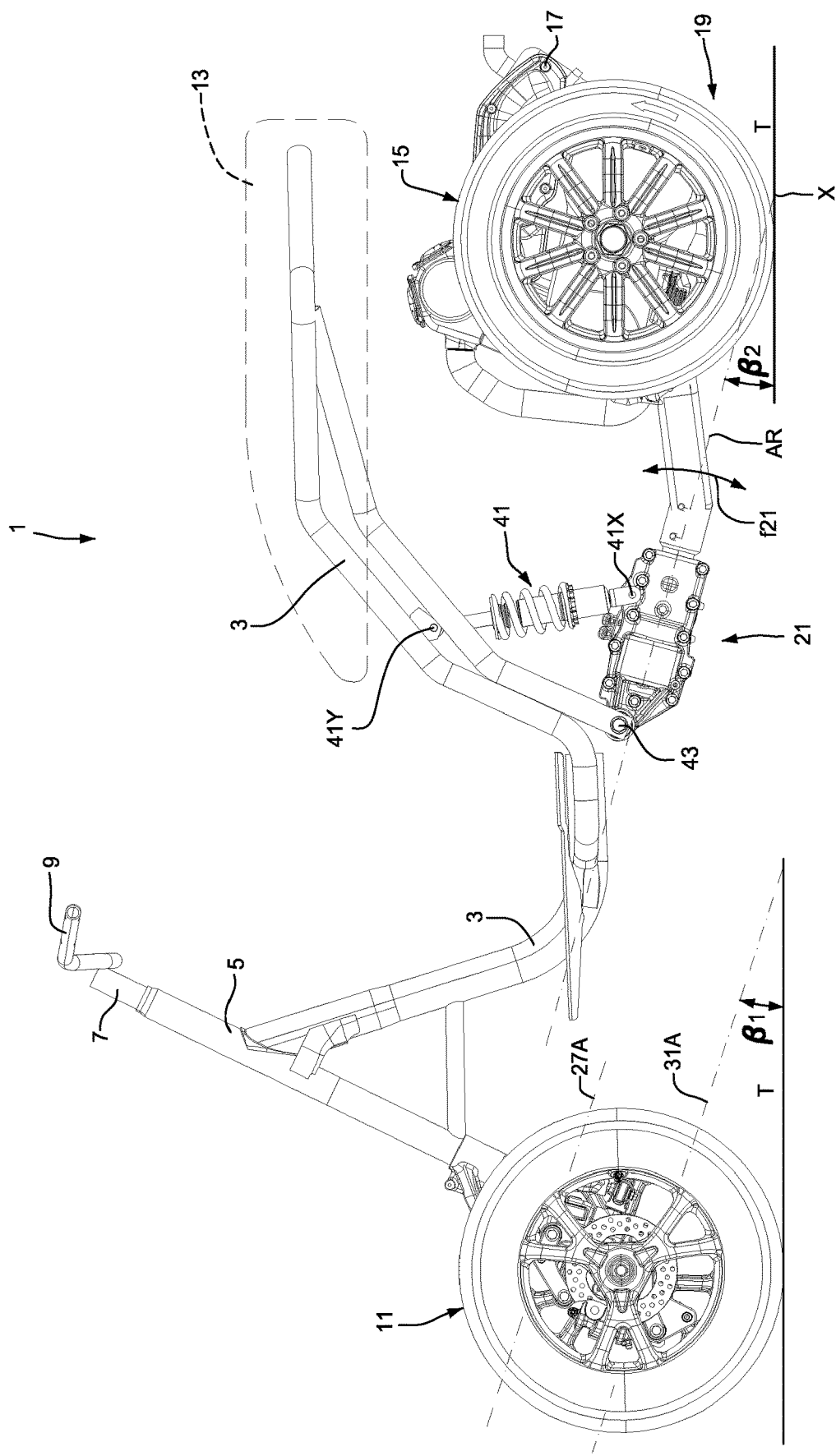
FIG. 13 shows a side view of a motor vehicle in a further embodiment.

FIG. 13 shows a side view, similar to the view in FIG. 1, of a different embodiment. The same numbers indicate parts the same as or corresponding to those in FIGS. 1 to 8. The main difference between the motor vehicle 1 of FIGS. 1 to 8 and the motor vehicle 1 of FIG. 13 consists in that the tilting joint 21 defines a roll axis AR that is not parallel to the ground, i.e., to the supporting surface T-T of the motor vehicle 1, but rather inclined relative to the plane T-T by an angle β2. Also in this case, the difference between the angle β2 and the angle β1 (formed with the plane T-T by the pivot axes of the tilting four-bar linkage 23 located in the front part of the motor vehicle 1) is preferably comprised between 0° and 30°, preferably between 0° and 15°.

In advantageous embodiments, the inclination of the roll axis AR relative to the supporting surface T-T of the motor vehicle 1, with the motor vehicle in an upright position and zero tilting angle, may advantageously be such that the point of incidence, i.e., the point of intersection, between the roll axis AR and the plane T-T is located between the two rear driving wheels 15A, 15B, and more advantageously along the area between the two points of contact of the rear driving wheels 15A, 15B with the ground, as indicated with the point X in FIG. 13.

Figure 14:
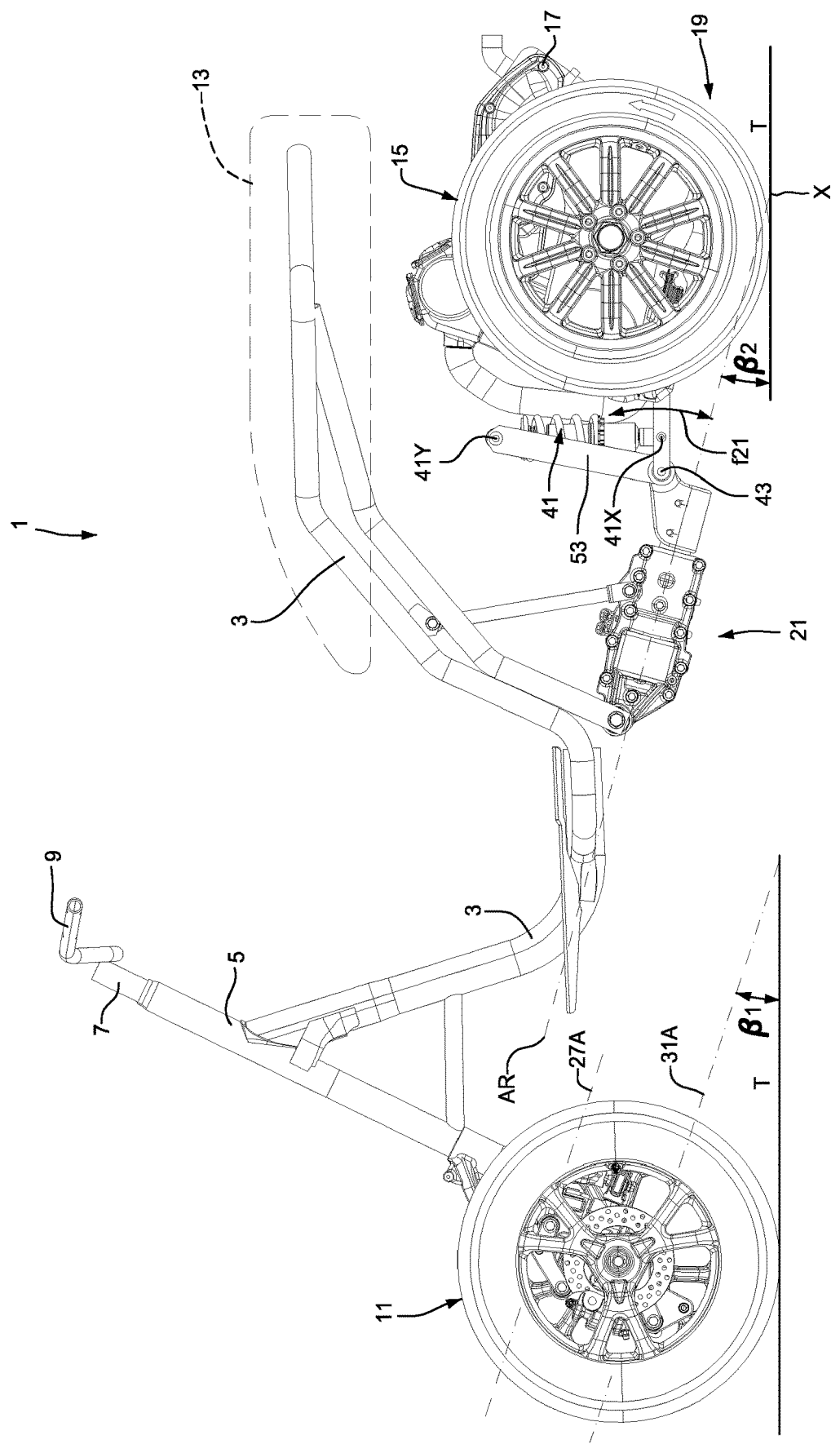
FIG. 14 shows a side view similar to the view of FIG. 13, of yet another embodiment.
Figure 19:
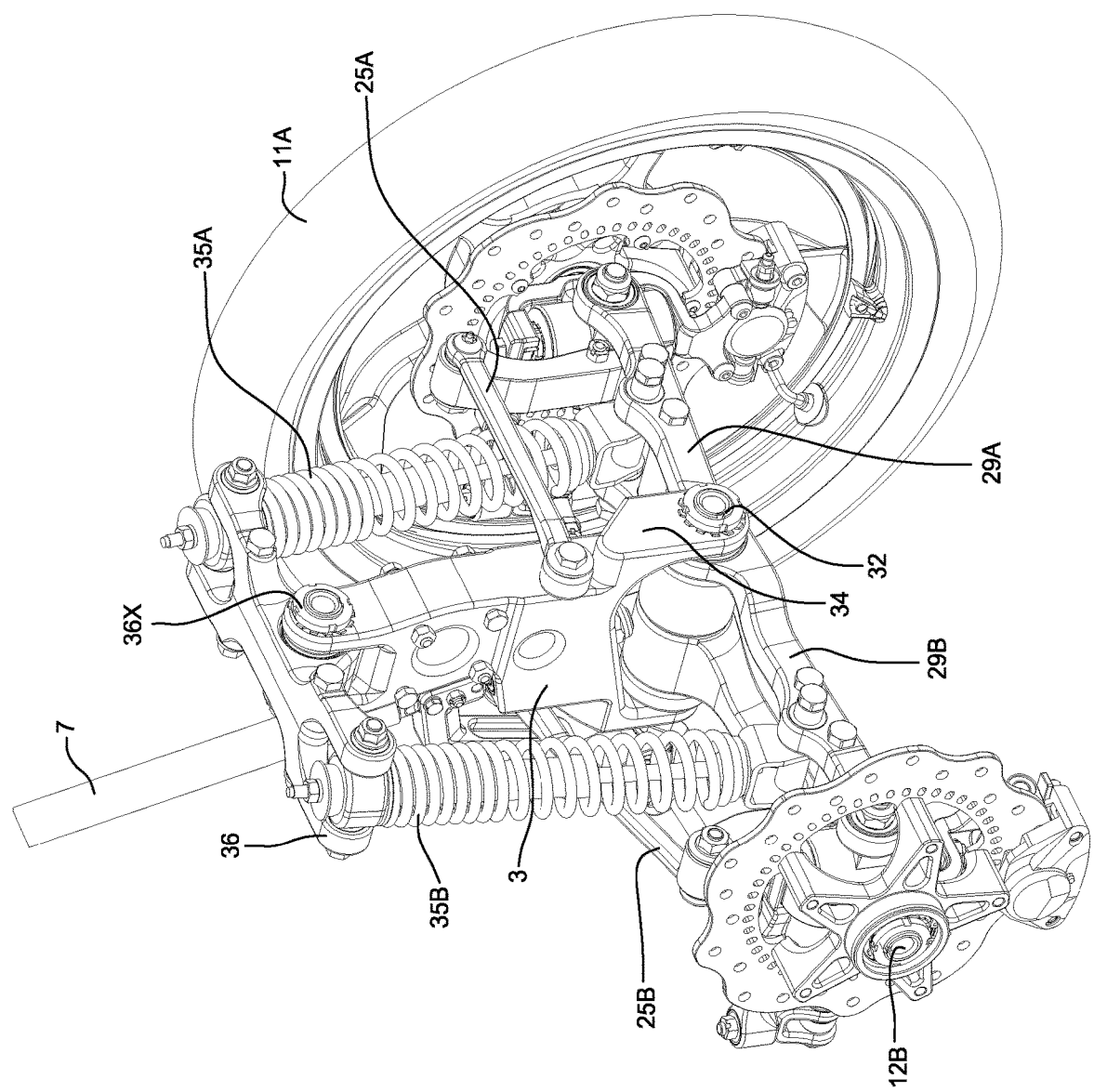

FIG. 14 shows a side view of a motor vehicle 1 similar to the motor vehicle of FIG. 19. The same numbers indicate parts the same as or corresponding to those already described. The main difference between FIG. 14 and FIG. 9 consists in that in FIG. 14 the tilting joint 21 is oriented in such a way as to define a roll axis AR inclined by an angle β2 different from zero relative to the supporting surface T-T of the motor vehicle, when the motor vehicle 1 is in an upright position, i.e., with zero tilting angle. Just as in the embodiment of FIG. 13, also in FIG. 14 the point of incidence X of the roll axis AR on the supporting surface T-T of the motor vehicle is preferably in the area located between the points or areas of contact of the two rear driving wheels 15A, 15B.

Figure 15:
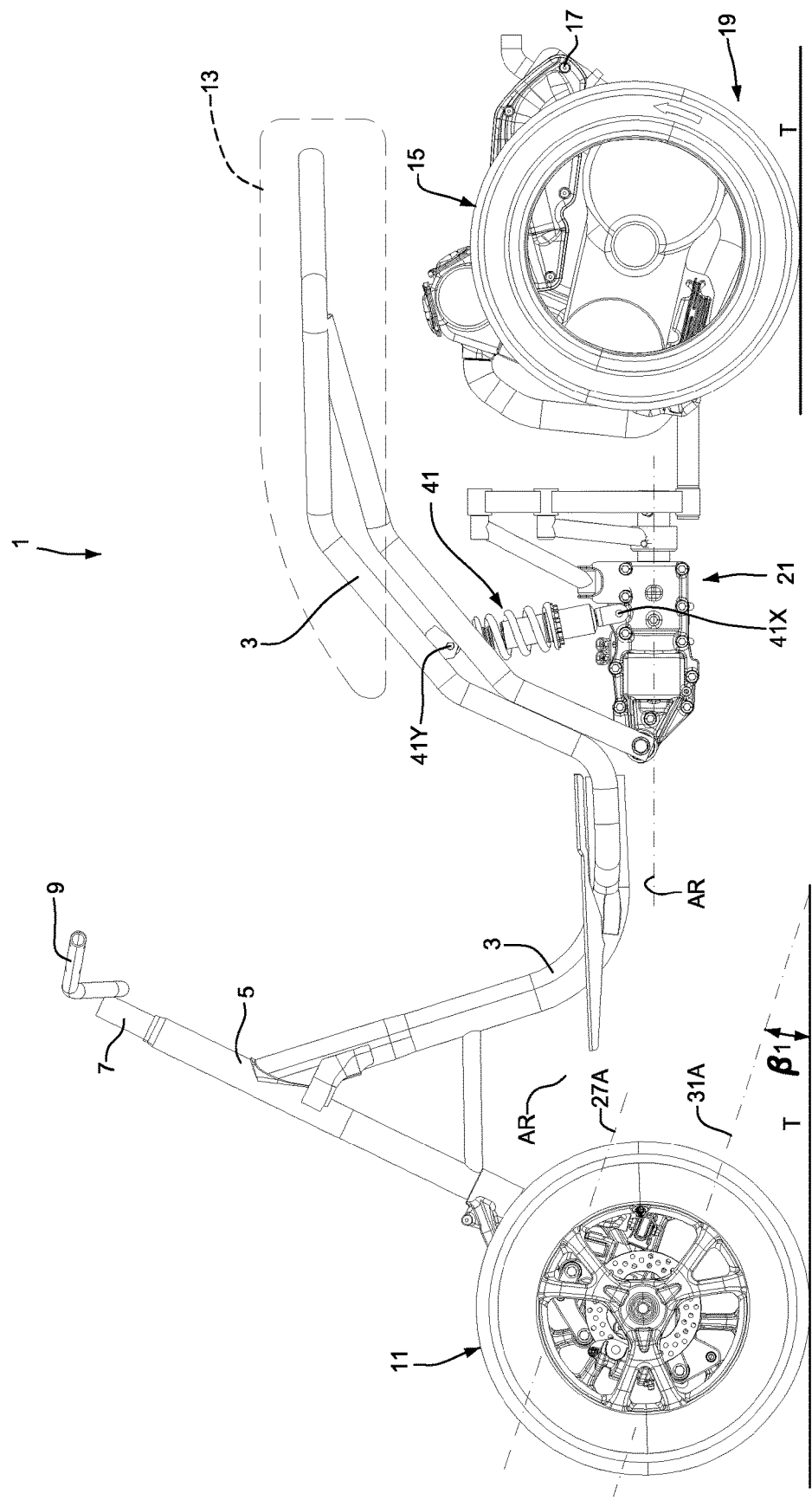
FIG. 15 shows a side view of a motor vehicle in a further embodiment.
Figure 16:
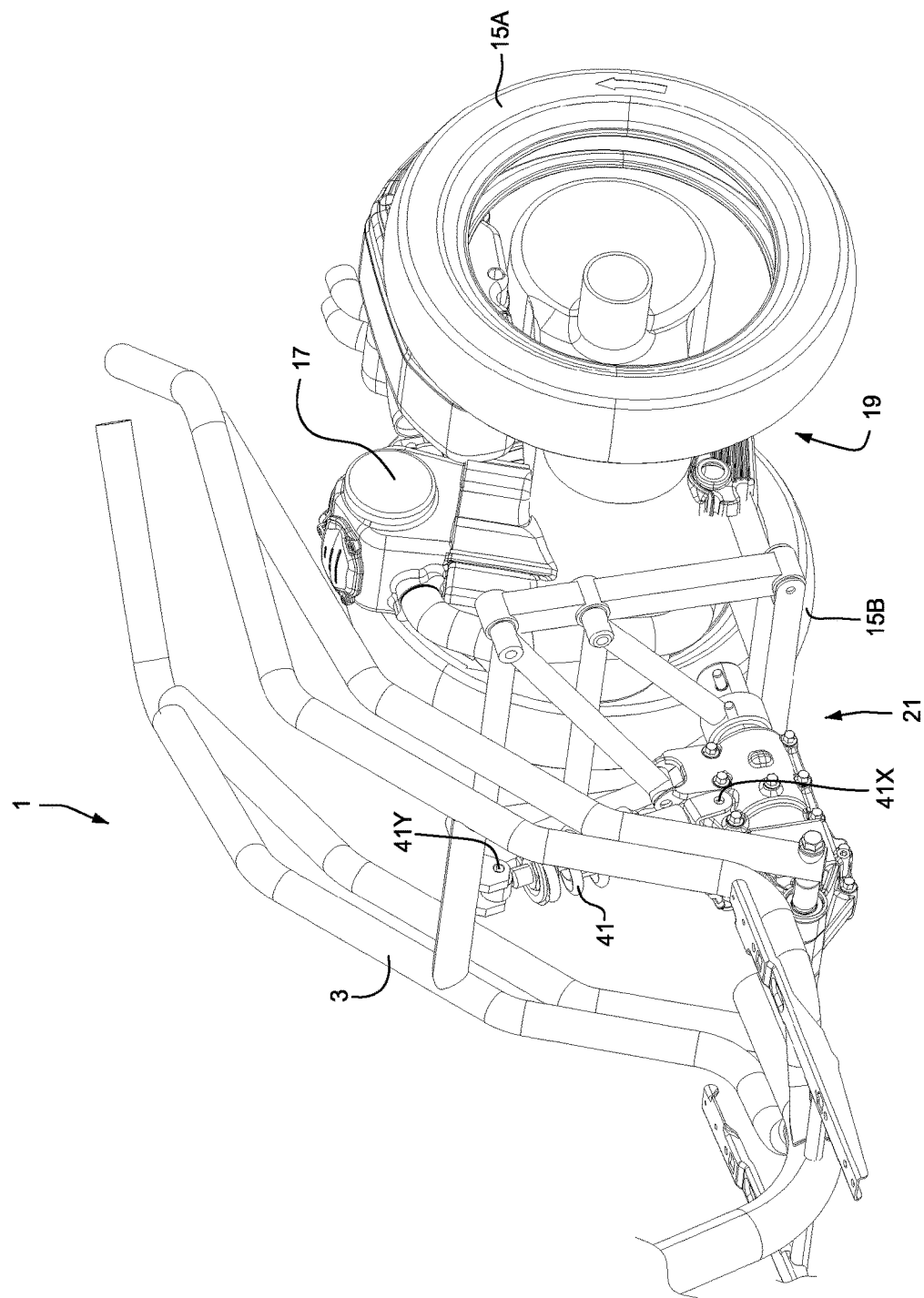
FIG. 16 shows a partial axonometric view of the motor vehicle of FIG. 15.

FIGS. 15 and 16 show a side view and a partial axonometric view, respectively, of a motor vehicle 1 similar to the motor vehicle of FIGS. 11 and 12, in a configuration in which the simple four-bar linkage of the latter figures is replaced by a more complex linkage system, the advantage of which consists in that the roll axis defined by said linkage system 21, which forms the tilting joint, is located on the supporting surface T-T of the motor vehicle and always remains in the median plane M-M even when the motor vehicle is tilted, i.e., with a non-zero tilting angle.

Figure 17:
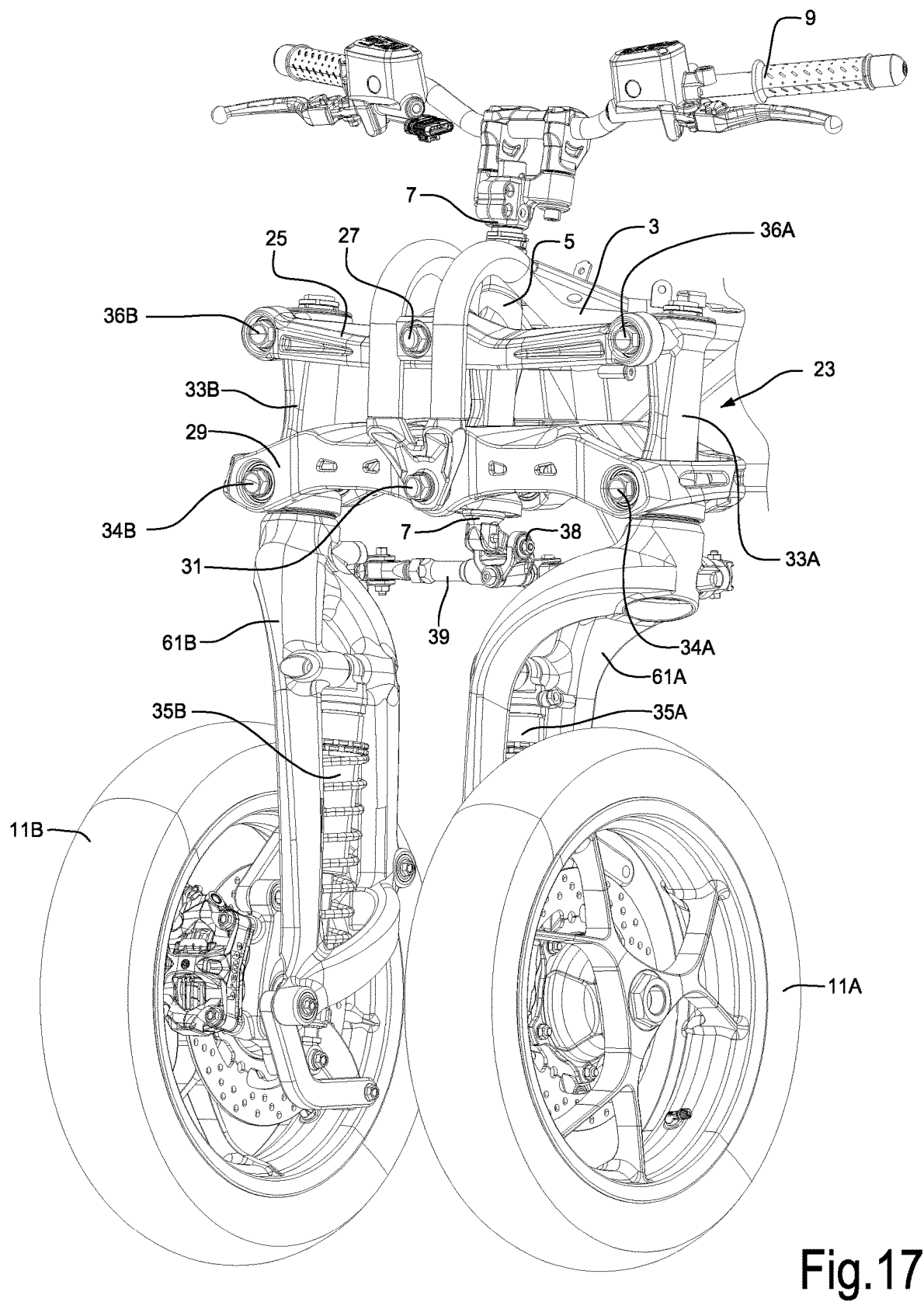
FIG. 17 shows an axonometric view of the front part of a motor vehicle in a further embodiment.

In the embodiments described so far, the tilting four-bar linkage 23 is placed in a low position, so that it is substantially within the volume between the two front steered wheels 11A, 11B. This configuration, however, is not the only one possible. FIG. 17 shows by way of example the front part of a motor vehicle in which the tilting four-bar linkage, again indicated with 23, is placed in a position higher than the two front steered wheels, again indicated with 11A, 11B. The upper cross-member or connecting rod of the tilting four-bar linkage is once again indicated with 25 and the lower cross-member or connecting rod with 29. The upper center hinge or pivot, with which the upper cross member 25 is pivoted to the frame 3, is indicated with 27. The lower center hinge or pivot, with which the lower cross member 29 is pivoted to the frame 3, is indicated with 31. The hinge axes 27, 31 form an angle β1 with the supporting surface of the motor vehicle 1, which may be equal to zero or different from zero. Just as in the embodiments described above, the difference between the angle β1 and the angle β2 formed by the roll axis AR (defined by the tilting joint 21) is preferably comprised between 0° and 30°, preferably between 0° and 15°, for example between 0° and 10°.

The tilting joint 21 and in general the central and rear part of the motor vehicle of FIG. 17 are not shown and can be configured as described with reference to the previous figures, by adapting the frame structure 3 to the arrangement of the tilting four-bar linkage 23 in the higher position.

FIG. 17 also shows the steering bar 39 and a joint 38 connecting the steering bar 39 to the steering column 7.

In the embodiment of FIG. 17, the two front steered wheels 11A and 11B are connected to the tilting four-bar linkage 23 by means of arms 61A, 61B, which can be supported within the uprights 33A and 33B so as to rotate around the steering axes. Suspensions 35A, 35B, each comprising an elastic member and a viscous member, may be provided between the front steered wheels 11A, 11B and the arms 61A 61B.

The structure of the front part of the motor vehicle illustrated in FIG. 17 is purely an example. Those skilled in the art know that tilting saddle-riding vehicles with a front tilting four-bar linkage in the upper position may have shapes different from the one illustrated, which may be used alternatively.

In the embodiments described above, the motor vehicle 1 comprises a single tilting four-bar linkage 23. In other embodiments, the motor vehicle 1 may comprise a different system for connecting the steered and tilting front wheels to the frame 3, this system comprising, for example, two four-bar linkages. A configuration of this type is illustrated by way of example in FIGS. 18 and 19, which show only a portion of the frame 3, the tilting four-bar linkage system and the hubs of the front steered wheels 11A, 11B. The latter are indicated with 12A and 12B. The suspensions for the two front steered wheels 11A, 11B are again indicated with 35A and 35B. The suspensions 35A, 35B are pivoted at the top to a crossbar 36, which is pivoted by means of a hinge 36X to the frame 3.

The tilting four-bar linkage 23A connecting the front steered wheel 11A to the frame 3 comprises an upper cross member 25A, hinged by means of a hinge or pivot 28 to the frame 3, and a lower cross member 29A, hinged by means of a hinge or pivot 32 to the frame 3. The tilting four-bar linkage 23B connecting the front steered wheel 11B to the frame 3 comprises an upper cross member 25B, hinged by means of a corresponding hinge or pivot to the hinge 28 to the frame 3, and a lower cross member 29A, hinged by means of the hinge or pivot 32 to the frame 3. The two four-bar linkages 23A and 23B have in common one side 34 formed by the frame 3 and extending between the hinges 28 and 32.

The embodiment of the double tilting four-bar linkage 23A, 23B is only an example. There are other solutions of this type, which differ, for example, for the arrangement of the suspension that instead of being double is single and central.

Figure 18:
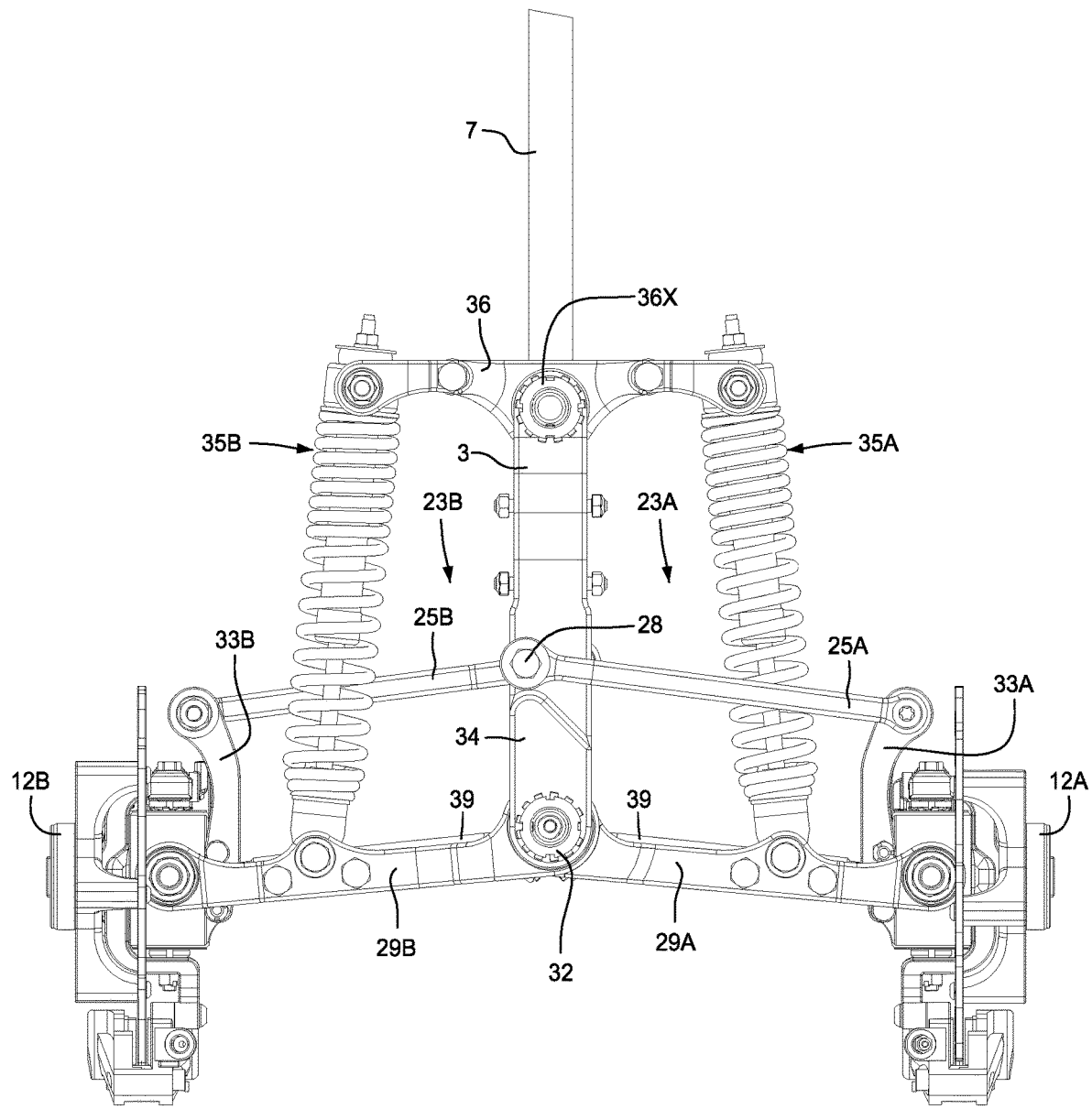
FIGS. 18 and 19 show a front view and an axonometric view, respectively, of a front part of a motor vehicle in yet another embodiment.

The double tilting four-bar linkage system of FIGS. 18 and 19 can be combined with any of the embodiments of the rear part of the motor vehicle 1 described above. Also in this case, the hinge axes of the two tilting four-bar linkages 23A, 23B, when the motor vehicle 1 is in an upright position with zero tilting angle, form an angle β1 with the supporting surface T-T of the vehicle that can be equal to the angle β2 formed with this surface by the roll axis AR, or different therefrom, with a difference equal to or less than 30°, preferably equal to or less than 15°, for example equal to or less than 10°.

The invention claimed is:

1. A tilting saddle-riding motorcycle comprising:
a frame;
a steering column integral with a handlebar and rotatably accommodated in a steering tube integral with the frame;
a left front steered wheel and a right front steered wheel connected to the frame with the interposition of at least one tilting four-bar linkage; wherein the left front steered wheel and the right front steered wheel are adapted to perform a tilting movement; and wherein said at least one tilting four-bar linkage comprises a plurality of components pivoted to one another around pivot axes parallel to one another, the deformation of said at least one tilting four-bar linkage allowing the frame, the left front steered wheel and the right front steered wheel to take a tilted position during travel;
a left rear driving wheel and a right rear driving wheel; supported by a non-tilting rear carriage, on which a propulsion unit of the motor vehicle is arranged;
a tilting joint, which connects the non-tilting rear carriage to the frame; wherein the tilting joint defines a roll axis around which the frame rotates relative to the rear carriage; and
a rear suspension, adapted to allow a springing movement of the frame relative to the rear carriage, and a suspension hinge defining a suspension axis extending in a transverse direction relative to the direction of travel of the vehicle, the frame and the rear carriage being adapted to perform springing movements around the suspension axis.

2. The motor vehicle of claim 1, wherein the propulsion unit is rigidly connected to the rear carriage, wherein the rear suspension is configured to absorb the springing movement of the frame.

3. The motor vehicle of claim 1, wherein the roll axis is comprised of a rotation axis of a hinge formed by the tilting joint.

4. The motor vehicle of claim 1, wherein the tilting joint comprises a connecting four-bar linkage, which connects the frame to the rear carriage; wherein the connecting four-bar linkage comprises: a lower transverse connecting rod integral with the frame; an upper transverse connecting rod integral with the rear carriage; a left rocker arm and a right rocker arm, which connect the upper connecting rod to the lower connecting rod.

5. The motor vehicle of claim 4, wherein the upper transverse connecting rod is longer than the lower transverse connecting rod; and wherein the left rocker arm and the right rocker arm are inclined relative to a median plane of the motor vehicle and converge toward each other from the upper transverse connecting rod to the lower transverse connecting rod.

6. The motor vehicle of claim 1, wherein when the motor vehicle is in an upright position with a zero tilting angle, the roll axis and the pivot axes of the at least one tilting four-bar linkage form between them an angle comprised between 0° and 30°.

7. The motor vehicle of claim 1, wherein, when the motor vehicle is arranged on a supporting surface with the left front steered wheel, the right front steered wheel, the left rear driving wheel and the right rear driving wheel in an upright position and with a zero tilting angle, the roll axis is inclined in relation to the supporting surface by an angle such that the roll axis intersects the supporting surface at a point of intersection approximately between the left rear driving wheel and the right rear driving wheel and is oriented from bottom to top in the direction of travel of the motor vehicle.

8. The motor vehicle of claim 7, wherein the point of intersection is between the contact area of the left rear driving wheel with the supporting surface, and the contact area of the right rear driving wheel with the supporting surface.

9. The motor vehicle of claim 1, wherein, when the motor vehicle is placed on a supporting surface with the left front steered wheel, the right front steered wheel, the left rear driving wheel and the right rear driving wheel, in an upright position and with a zero tilting angle, the roll axis is approximately parallel to the supporting surface.

10. The motor vehicle of claim 1, wherein said at least one tilting four-bar linkage comprises:
an upper cross member pivoted to the frame with an upper central pivot around an upper center pivot axis;
a lower cross member pivoted to the frame with a lower central pivot around a lower central pivot axis;
a left upright, pivoted to a left end of the upper cross member and to a left end of the lower cross member, around pivot axes parallel to each other and parallel to the upper central pivot axis and the lower central pivot axis;
a right upright, pivoted to a right end of the upper-upper cross member and to a right end of the lower cross member, around pivot axes parallel to each other and parallel to the upper central pivot axis and to the lower central pivot axis.

11. The motor vehicle of claim 10, wherein the left front steered wheel is connected to the at least one tilting four-bar linkage by means of a left front suspension and the right front steered wheel is connected to the at least one tilting four-bar linkage by mean of a right front suspension.

12. The motor vehicle of claim 1, wherein the at least one tilting four-bar linkage is arranged between the left front steered wheel and the right front steered wheel.

13. The motor vehicle of claim 1, wherein the at least one four-bar linkage is arranged at a greater height relative to the left front steered wheel and to the right front steered wheel.

14. The motor vehicle of claim 1, wherein said at least one tilting four-bar linkage comprises a left tilting four-bar linkage constrained to the left front steered wheel and a right tilting four-bar linkage constrained to the right front steered wheel.

15. The motor vehicle of claim 1, wherein the suspension hinge is arranged between the rear carriage and the tilting joint.

16. The motor vehicle of claim 15, wherein the rear suspension is arranged between the rear carriage and the tilting joint.

17. The motor vehicle of claim 1, wherein the suspension hinge is arranged between the tilting joint and the frame, the suspension hinge being defined by at least a portion of the tilting joint and the frame.

18. The motor vehicle of claim 17, wherein the rear suspension is hinged with a first end to the tilting joint and with a second end to the frame, the rear carriage, the propulsion unit, the left rear driving wheel and the right rear driving wheel being connected to the frame via the suspension hinge.

19. The motor vehicle of claim 1, wherein the pivot axes of the at least one tilting four-bar linkage are parallel to a supporting surface of the motor vehicle.

20. The motor vehicle of claim 1, wherein the pivot axes of the at least one tilting four-bar linkage are inclined relative to the supporting surface of the motor vehicle.

21. The motor vehicle of claim 20, wherein the pivot axes of the at least one tilting four-bar linkage are inclined, relative to the supporting surface of the motor vehicle, from bottom to top in the direction of travel of the motor vehicle, so that the point of intersection between said axes and the supporting surface is located behind the left front steered wheel and the right front steered wheel relative to the direction of travel of the motor vehicle.

* * * * *